United States Patent
Chopra et al.

(10) Patent No.: US 9,069,482 B1
(45) Date of Patent: Jun. 30, 2015

(54) METHOD AND SYSTEM FOR DYNAMIC SNAPSHOT BASED BACKUP AND RECOVERY OPERATIONS

(71) Applicant: EMC Corporation, Hopkinton, MA (US)

(72) Inventors: Shelesh Chopra, Bangalore (IN); Joe Putti, San Jose, CA (US)

(73) Assignee: EMC CORPORATION, Hopkinton, MA (US)

( * ) Notice: Subject to any disclaimer, the term of this patent is extended or adjusted under 35 U.S.C. 154(b) by 144 days.

(21) Appl. No.: 13/715,659

(22) Filed: Dec. 14, 2012

(51) Int. Cl.
G06F 12/00 (2006.01)
G06F 3/06 (2006.01)

(52) U.S. Cl.
CPC ..................................... *G06F 3/065* (2013.01)

(58) Field of Classification Search
None
See application file for complete search history.

(56) References Cited

U.S. PATENT DOCUMENTS

| | | | | |
|---|---|---|---|---|
| 6,549,992 | B1 * | 4/2003 | Armangau et al. | 711/162 |
| 7,487,310 | B1 * | 2/2009 | Bingham et al. | 711/162 |
| 8,127,095 | B1 * | 2/2012 | Colgrove et al. | 711/162 |
| 8,140,791 | B1 * | 3/2012 | Greene | 711/162 |
| 8,244,998 | B1 * | 8/2012 | Krinke, II | 711/162 |
| 8,245,078 | B1 * | 8/2012 | Chatterjee et al. | 714/20 |
| 8,433,848 | B1 * | 4/2013 | Naamad et al. | 711/114 |
| 2003/0084076 | A1 * | 5/2003 | Sekiguchi et al. | 707/205 |
| 2004/0181641 | A1 * | 9/2004 | Nguyen et al. | 711/162 |
| 2005/0039085 | A1 * | 2/2005 | Takeda et al. | 714/57 |
| 2005/0060356 | A1 * | 3/2005 | Saika | 707/204 |
| 2006/0047813 | A1 * | 3/2006 | Aggarwal et al. | 709/226 |
| 2006/0064481 | A1 * | 3/2006 | Baron et al. | 709/224 |
| 2006/0069887 | A1 * | 3/2006 | LeCrone et al. | 711/162 |
| 2007/0214197 | A1 * | 9/2007 | Bolik et al. | 707/204 |
| 2008/0301201 | A1 * | 12/2008 | Sugimoto et al. | 707/204 |
| 2009/0157870 | A1 * | 6/2009 | Nakadai | 709/224 |
| 2010/0017445 | A1 * | 1/2010 | Kobayashi | 707/204 |
| 2010/0228933 | A1 * | 9/2010 | Braginsky et al. | 711/162 |

FOREIGN PATENT DOCUMENTS

| | | | | | |
|---|---|---|---|---|---|
| CN | | 1526227 A | * | 9/2004 | H04L 12/56 |
| WO | WO 2014/002094 A2 | * | 3/2014 | G06F 11/12 |

* cited by examiner

*Primary Examiner* — Daniel Bernard
(74) *Attorney, Agent, or Firm* — Dergosits & Noah LLP; Todd A. Noah (57) ABSTRACT

Disclosed are systems and methods for performing backup and recovery operations. An indication may be received, where the indication indicates that a first backup or recovery operation should be performed for at least one storage location. The storage location may be associated with a software application configured to provide backup and recovery services for the at least one storage location. A plurality of resources may be identified, where the plurality of resources is a pool of resources configured to store a backup of one or more data values stored in the at least one storage location. A first resource of the plurality of resources may be selected as a target of the backup or recovery operation. In various implementations, the first resource is selected based on one or more performance capabilities of at least one resource of the plurality of resources.

20 Claims, 10 Drawing Sheets

METHOD AND SYSTEM FOR DYNAMIC SNAPSHOT BASED BACKUP AND RECOVERY OPERATIONS

BACKGROUND

The present invention relates to the field of information technology, including, more particularly, systems and methods for facilitating one or more backup or recovery operations.

Backup and recovery operations may be used to copy or archive computer data so that it may be used to restore the original data after a data loss event. A snapshot backup may be used to save the current state of a system. The saved state may be recovered and used to restore the system to the point at which the system's state was last saved. Thus, backup operations may be initiated periodically and automatically to routinely save a state of a system. A backup may be hardware or array-based and use a system such as Symmetrix®, CLARiiON®, RecoverPoint®, or Celera®. A backup may also be software based and use a system such as VMware®, VSS, or Volume Manager.

Conventional methods of performing backup and recovery operations remain limited because a relationship between a client that is being backed up, such as a production host, and a target of the backup operation, such as a mount host, remains fixed. Thus, once the relationship is specified, it cannot be easily changed and cannot address issues which may arise during run time such as hardware failure and overloading of resources.

DETAILED DESCRIPTION

Backup and recovery systems may have several components. One component may be a source or production host, which is a host computer or server that is connected to a network and is used to host the data to be backed up. Another component may be a source logical unit number (LUN), which may be a storage node or storage location, such as a logical disk, that the production host has provisioned to store the data that will be backed up. For example, a production host may have source LUNs in backup systems such as Symmetrix and CLARiiON®. Another component may be a mount host or proxy host, which may be a host computer or server that is connected to a network and is used to store or mount backup information, such as snapshot backups. Yet another component may be a target LUN, which may be a storage location, such as another logical disk, that is provisioned by the mount or proxy host to store one or more backups. Thus, a backup or snapshot backup may be saved to a target LUN. Another component may be a backup server that may manage one or more backup or recovery operations.

Conventional backup or recovery systems lock the relationship between client or production hosts and mount hosts. Thus, a client initially declares which mount host it will use, and that declaration remains fixed through subsequent backup and recovery operations. Furthermore, conventional methods of proxy host configuration typically map a single proxy host to a client through a manual process of configuration. For example, if a proxy host is to be specified for hardware or software backup or recovery operations, a user has to manually choose the host server which will act as proxy host. Once this relationship is defined, the configuration is static. Thus, if the system performs any backup operations after declaration of this relationship, the client will always be mapped to the identified proxy host. If the proxy hosts fails, becomes inoperative, is busy, or is otherwise unavailable, the backup or recovery operation will fail. Thus, if the user then changes the configuration and selects a different proxy host, the user will have to make that change manually. Therefore, the user will have to go back into a configuration application, which may be a software application that manages the backup operation, and manually identify and select another proxy host. Thus, when using conventional methods, this process has to be repeated every time the relationship between a client and a proxy host is changed.

Accordingly, conventional methods have a fixed mapping between a client and a proxy host. The fixed relationship between the client and proxy hosts does not provide any mechanisms for implementing load balancing or failover dynamically, automatically, and during run time. Thus, when using conventional methods, one proxy host can be totally overloaded while another is underutilized. Furthermore, conventional failover mechanisms in the context of backup and recovery operations are not dynamic. One proxy host may go down in service mode, and the backup or recovery operation would fail without failing over to an available proxy host. Thus, conventional methods require more maintenance because the user has to make all changes to the configuration of client and proxy hosts manually, and because conventional methods don't provide the flexibility to identify a proxy host dynamically at run time.

In various implementations, systems and methods are disclosed that provide backup and recovery operations that identify one or more proxy hosts dynamically and at run time. Thus, the relationship between a client and a proxy host remains flexible and may be changed dynamically and at run time in the event of overloading, failure, or any other circumstance which may cause a proxy host to become unavailable. In some implementations, a user may initially provide a configuration value that identifies a pool of resources, such as proxy or mount hosts. During run time, which may be at the time of any subsequent backup or recovery operation, a proxy host may be selected from the pool of resources. The proxy host may be selected based on availability, operability, or any other factor which may result in enhanced performance of the backup or recovery operation.

Accordingly, various implementations of the systems and methods disclosed herein do not have a fixed mapping between clients and proxy hosts. Thus, mechanisms for load balancing and compensating for failover may be implemented dynamically and at run time. Moreover, a user need not make any configuration changes. While the user may configure the pool of resources initially, changes in subsequent backup and recovery operations may be performed automatically thus reducing the amount of maintenance and overhead involved.

Figure 1:
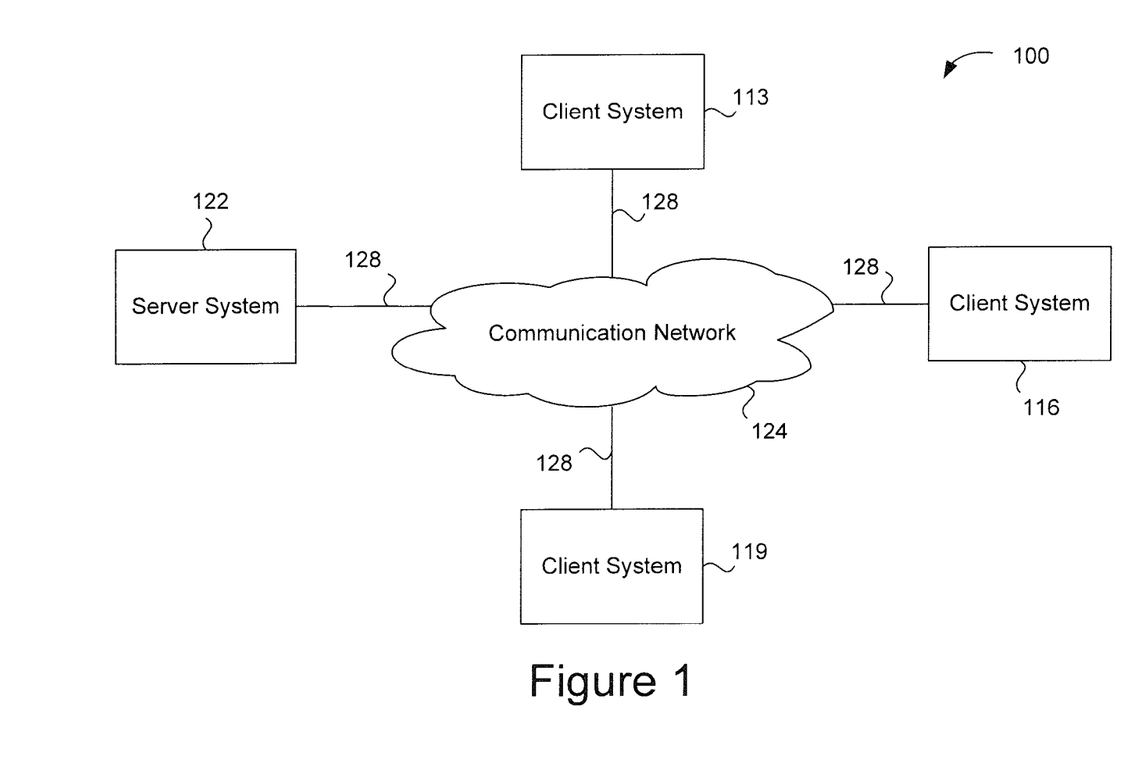
FIG. 1 shows a block diagram of a client-server system and network, implemented in accordance with some implementations.

Prior to describing the subject matter in detail, an exemplary computer network in which the subject matter may be implemented shall first be described. Those of ordinary skill in the art will appreciate that the elements illustrated in FIG. 1 may vary depending on the system implementation. With reference to FIG. 1, FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the invention have been described using a client-server environment, it should be apparent that the invention may also be embodied in a stand-alone computer system. Aspects of the invention may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer® browser program provided by Microsoft® Corporation, and the Firefox® browser provided by Mozilla® Foundation, and others.

Figure 2:
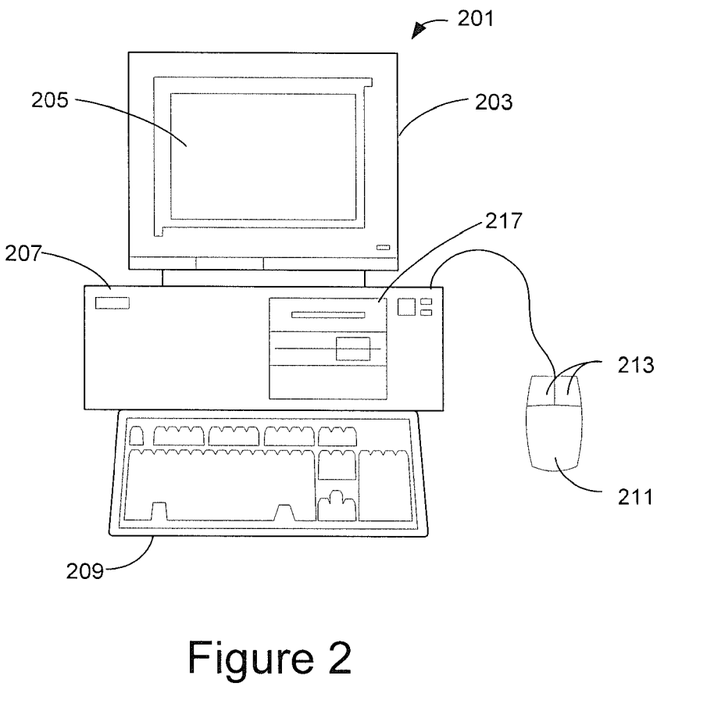
FIG. 2 shows a more detailed diagram of an exemplary client or computer, implemented in accordance with some implementations.

FIG. 2 shows an exemplary client or server system. In an embodiment, a user interfaces with the system through a computer workstation system, such as shown in FIG. 2. While FIG. 2 illustrates a computer workstation, the user can interface with the system through a mobile device such as a mobile phone, laptop computer, or computer tablet. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of various implementations may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of software may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
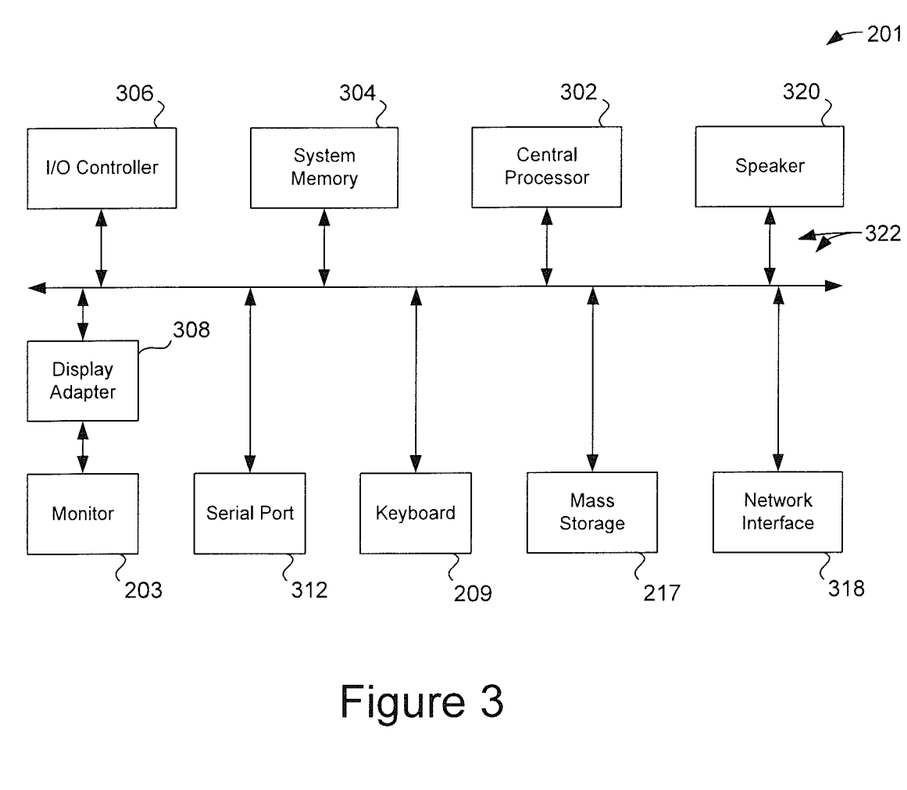
FIG. 3 shows a system block diagram of a client computer system, implemented in accordance with some implementations.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB)

port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab® (from MathWorks), SAS, SPSS, JavaScript®, AJAX, Java®, SQL, and XQuery (a query language that is designed to process data from extensible markup language (XML) files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95®, 98, Me, Windows NT®, Windows 2000®, Windows XP®, Windows XP® x64 Edition, Windows Vista®, Windows 7®, Windows CE®, Windows Mobile®), Linux®, HP-UX, UNIX, Sun OS®, Solaris®, Mac OS X®, Alpha OS®, AIX, IRIX32, or IRIX64. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
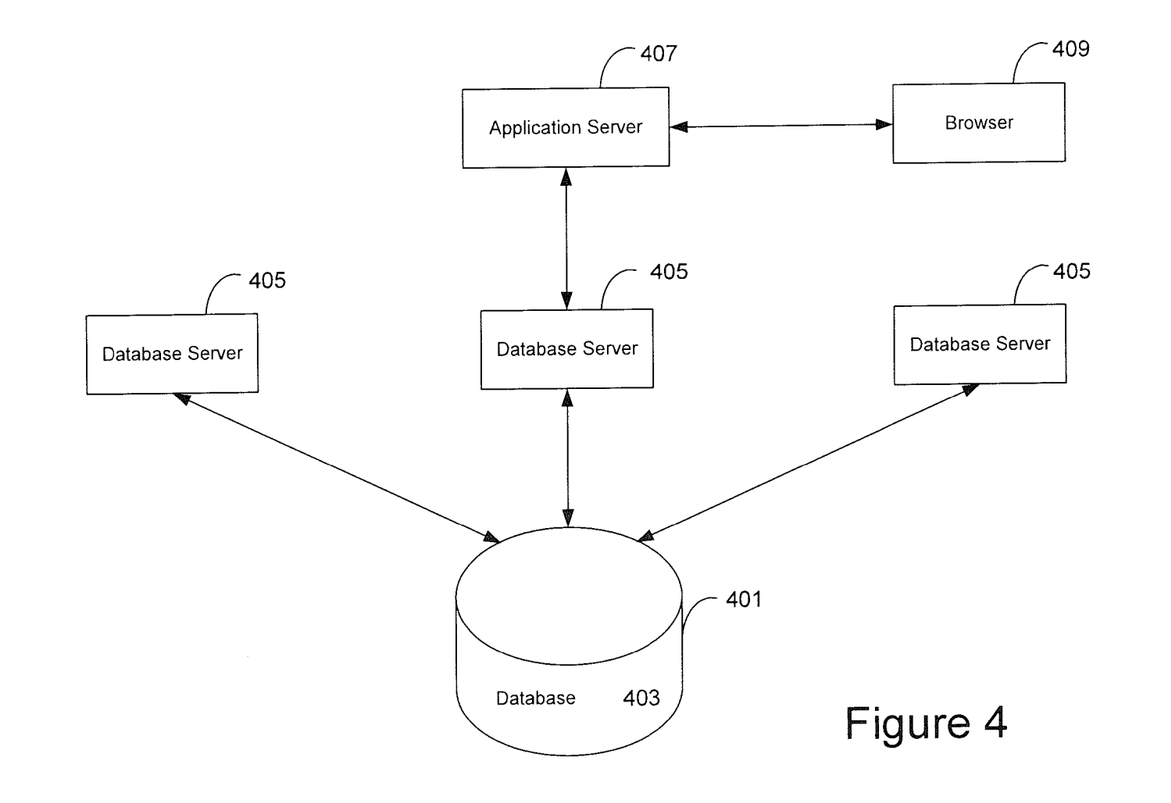
FIG. 4 shows a data source or data service in the form of a database system, implemented in accordance with some implementations.

FIG. 4 shows a data source or data service in the form of a database system. A database may be part of a database management system associated with an enterprise application. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is an XML database. An XML database is a data persistence software system that allows data to be stored in XML format. Another example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various portions of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 5:
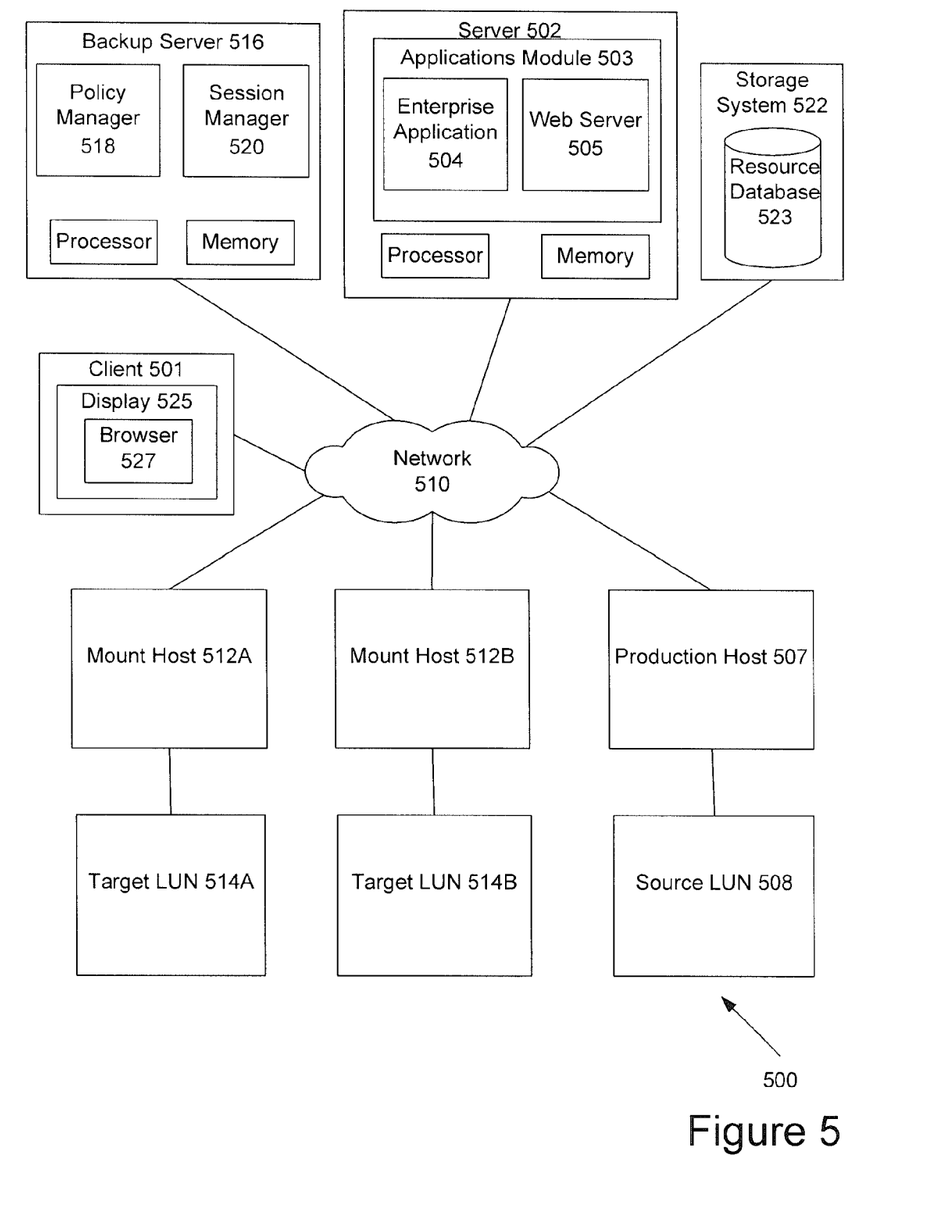
FIG. 5 shows a block diagram of an example of a system for selecting one or more resources for a backup or recovery operation, implemented in accordance with some implementations.

FIG. 5 shows a block diagram of an example of a system for selecting one or more resources for a backup or recovery operation, implemented in accordance with some implementations. In various implementations, system 500 may include server 502, applications module 503, enterprise application module 504, web server 505, production host 507, source LUN 508, network 510, proxy host 512A, proxy host 512B, target LUN 514A, target LUN 514B, backup server 516, policy manager 518, session manager 520, storage system 522, and storage volume 523. Moreover, system 500 may include any number of client machines such as client machine 501 which may access various components of system 500 via network 510.

Client machines may be general purpose computers with hardware and software, such as shown in FIGS. 1 and 3 described above. For example, client machine 501 may include a display 525, an application program (e.g., first browser program) 527, an input device, a processor, memory, and storage.

FIG. 5 shows one client machine. It should be appreciated that an enterprise can have any number of client machines such as tens, hundreds, or thousands of clients. The client machines execute executable code (or computer-readable code) that embodies a technique or algorithm as described in this application. The browser is an application program that can request, receive, and process data from a user, the server, or both. The data can be shown via a display. While FIG. 5 illustrates the data being displayed on a client machine, the data can also be displayed on a mobile device such as a mobile phone, laptop computer, or computer tablet.

In various implementations, system 500 may include server 502 having components similar to those described in FIGS. 1 and 4. Server 502 may include hardware and software used to run one or more services to serve the needs of other computers and users on network 510. Thus, server 502 may include one or more processors and memory capable of executing software operations and serving webpages. It will be appreciated that server 502 may comprise several servers in a distributed or cloud computing network.

In various implementations, server 502 includes an applications module 504, which includes software and hardware that may be used to execute one or more software applications. Thus, applications module may include software and/or firmware instructions that configure the functionality of server 502. For example, applications module 504 may include enterprise application 506, which includes software instructions that, when executed by one or more processors, perform one or more operations associated with an enterprise application. Thus, enterprise application 506 may include software instructions that configure operation of the enterprise application. In various implementations, the enterprise application may be a backup and recovery application such as NetWorker® provided by EMC²®. Thus, the enterprise application may provide backup and recovery services for one or more clients in a cloud.

Applications module 504 may also include an application used to serve webpages, such as web server 508. Web server 508 serves web pages to a client machine operated by a user of the enterprise application. According to some implementations, web server 508 may deliver webpages and other content from a storage volume of server 502 to the browsers of the client machines such that an enterprise application may be accessible to a client machine over network 510 using the browser. For example, a user at client machine 501 may login by using a browser to access the application. The application may require that the user input a username and a password so that the user can be authenticated. The user may be an employee, colleague, partner, or member of a company, organization, entity, partnership, joint venture, or have a business relationship with other users (e.g., supplier-manufacturer relationship, or client-vendor relationship), and so forth.

System 500 may also include proxy host 507, which may be a server or server-computer that includes components similar to the components described in FIGS. 1 and 4. Proxy host 507 may include hardware and software configured to manage the storage of data in various storage nodes and storage locations that may be implemented in a storage area network. For example, proxy host 507 may be configured to manage and host the data for which a backup or recovery operation has been requested. Thus, production host 507 may provide connectivity between a data source, such as a storage location, and other network components involved in backup and recovery processes.

In some implementations, system 500 may include source LUN 508, which may be a storage node or storage location, such as a logical disk, that provides the source of information or data for the backup or recovery operation. Thus, the information or data that will be backed up is stored in source LUN 508. Source LUN 508 may be part of a zoning scheme implemented in a storage area network. For example, source LUN 508 may be zoned according to soft zoning, hard zoning, or broadcast zoning scheme. Source LUN 508 may be implemented in one or more storage volumes, such as non-transitory mass storage devices.

System 500 may further include proxy hosts 512A and 512B, which include hardware and software configured to manage the storage of data in various storage nodes and storage locations that are implemented in a storage area network. Proxy hosts 512A and 512B may be configured to manage and host data at a target location of a requested backup or recovery operation. Thus, proxy hosts 512A and 512B may provide connectivity between target storage locations and other network components involved in backup and recovery processes, such as production host 507.

In addition, system 500 may include target LUNs 514A and 514B, which can be storage nodes or storage locations, such as logical disks, that provide a target for information or data that is the subject of the backup or recovery operation. Target LUNs 514A and 514B may be part of a zoning scheme implemented in a storage area network. As similarly discussed above, target LUNs 514A and 514B may be zoned according to soft zoning, hard zoning, or broadcast zoning scheme and may be implemented in one or more storage volumes, such as non-transitory mass storage devices.

In various implementations, system 500 may include backup server 516, configured to manage one or more backup and recovery operations and store metadata about the backup and recovery operations. In some implementations, backup server 516 may include policy manager 518, a server-implemented process executed by one or more processors of backup server 516. Policy manager 518 may be configured to store and maintain one or more rules and or computer-implemented algorithms that may be used to identify a target resource for a particular backup or recovery operation. Thus, policy manager 518 may include hardware and software logic configured to perform one or more steps of a resource selection method, as described herein.

Backup server 516 may further include session manager 520, a server-implemented process executed by one or more processors of backup server 516. Session manager 520 may be configured to maintain a list of operations associated with one or more servers over one or more sessions. Thus, session manager 520 may monitor activities and operations of proxy hosts 512A and 512B and determine whether or not each respective host server is currently performing an operation and is busy, or is not performing an operation and is not busy. Session manager 520 may log and store information describing the activities of one or more host servers in a storage device of backup server 516, in a different storage system or database, such as storage system 522, or both.

System 500 may also include storage system 522 that stores data generated or retrieved by backup server 516, policy manager 518, and session manager 520. Storage system 522 may include a storage volume, such as resource database 523. Resource database 523 may be a non-transitory storage medium that stores resource configuration information, such as one or more resource configuration values.

Figure 6:
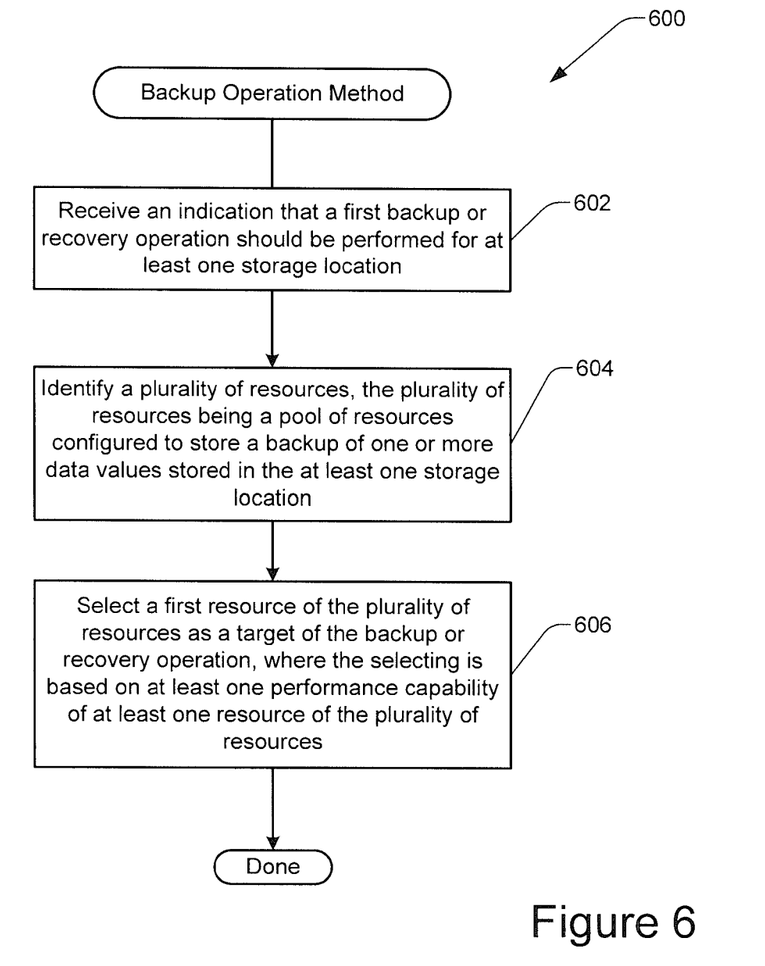
FIG. 6 shows a flowchart of an example of a method for selecting a resource for a backup or recovery operation, performed in accordance with some implementations.

FIG. 6 shows a flowchart of an example of a method for selecting a resource for a backup or recovery operation, performed in accordance with some implementations. In various implementations, method 600 may configure a pool of resources at run time to dynamically assign a resource to a client for a requested backup or recovery operation. In this way, the backup or recovery operation may be performed while compensating for changes in real-time load and availability of resources in resource pools.

Accordingly, at step 602, an indication that a backup or recovery operation should be performed for at least one storage location may be received. The indication may be a request for a backup or recovery operation received from a user or from a system component as part of an automated process. Thus, in response to a user request or a system generated request, a backup or recovery operation may be initiated.

At step 604, a plurality of resources may be identified, where the plurality of resources is a pool of resources configured to store a backup of one or more data values stored in the at least one storage location. Thus, each of the plurality of resources is capable of being a target of the backup or recovery operation of the at least one storage volume. In various implementations, the plurality of resources may be identified based on a previously determined resource configuration value that maps multiple resources in one or more pools of resources to the client for which the backup or recovery operation has been requested.

At step 606, at least one of the plurality of resources may be selected as a target of the backup or recovery operation. The selecting may be based on one or more performance capabilities of at least one of the plurality of resources. Thus, a pool of identified resources may be analyzed to determine which resources are available and capable of performing a backup operation. A resource may be selected based on its current capabilities and its availability, thus achieving optimal performance of the backup or recovery operation. The selection may also be based on other factors, such as a preferred order and a set of predetermined rules.

Figure 7:
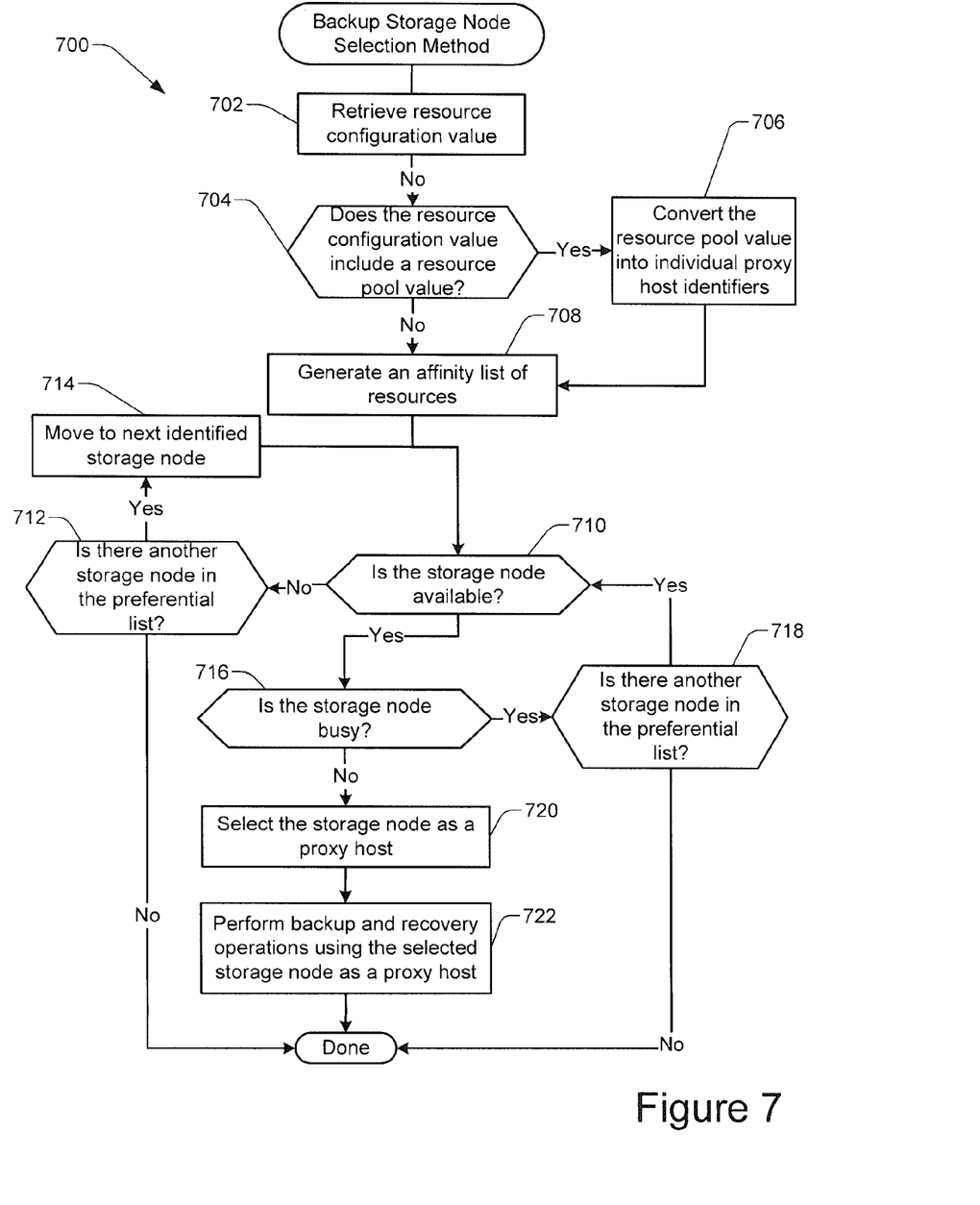
FIG. 7 shows a flowchart of an example of a method for selecting a storage node for a backup or recovery operation, performed in accordance with some implementations.

FIG. 7 shows a flowchart of an example of a method for selecting a storage node for a backup or recovery operation, performed in accordance with some implementations. As previously discussed, a cloud-based software application, such as NetWorker® provided by EMC²®, may be used to provide backup or recovery services for a client. In various implementations a backup or recovery operation may be requested by a user of the software application. The backup or recovery operation may be part of an automated process that is performed automatically and during run-time. Thus, according to various implementations, multiple resources may be mapped to a client and selected at run time. Accordingly, the selection and assignment of resources used during the backup or recovery operation may be performed automatically and without further input from a user.

At step 702, a resource configuration value may be retrieved in response to the initiation of a backup request. As previously discussed, a resource may be a storage node or storage location that may be managed by a backup server in conjunction with a host server. A resource configuration value may be one or more data values or a data file capable of configuring an initial pool of resources that may be used during a backup or recovery operation of a client. Thus, the resource configuration value may include information that enables the backup server to determine which resources are used during the backup or recovery operation. As discussed in greater detail below, the resource configuration value may be one or more data values that directly or indirectly identify several proxy or mount hosts.

In various implementations, the resource configuration value may be created by a user when a software application, such as a backup or recovery application, is initially configured. Alternatively, the resource configuration file may be created automatically. For example, a system generated default value may be used if no configuration value is received from a user. The resource configuration value may be retrieved by querying one or more storage locations. In some implementations, a cloud service provider may provide the software application with a storage path dedicated to storing the resource configuration value. The storage path may be, for example, a storage location in one or more storage volumes of a storage system associated with the backup server. Thus, the backup server may query the storage location to retrieve the resource configuration value.

Once the resource configuration value has been retrieved, at step 704, it may be determined whether or not the resource configuration value includes a resource pool value that identifies one or more pools of resources. The resource pool value may include one or more data values that identify a specific pool of resources that may be used during a backup or recovery operation. Thus, the resource pool value may be an identifier that indirectly identifies proxy host servers that may be used during the backup or recovery operation. For example, the resource pool value may be a pool name that is used as a representation of a group or pool of multiple proxy or mount hosts.

If the resource configuration value includes a resource pool value, at step 706, the resource pool value may be converted or translated into individual proxy host identifiers. As previously discussed with reference to step 704, the resource pool value may be defined by an identifier, such as a pool name, that represents multiple host servers. The pool name may be converted or translated into a list of individual resources, such as proxy hosts or mount hosts, based on information managed by the backup server. For example, the conversion may be based on a predetermined mapping scheme that maps a resource pool value to a list of resources. As similarly discussed with reference to the creation of the resource configuration value, the mapping scheme may be determined by a user, automatically, by a software developer, or by a system administrator. The mapping scheme may be stored in a storage system associated with a backup server, such as a resource database, which maintains one or more data tables that associate pool names with proxy host names. It will be appreciated that a client may be mapped to more than one pool of resources. Moreover, more than one client may be mapped to a single pool of resources.

Figure 8:
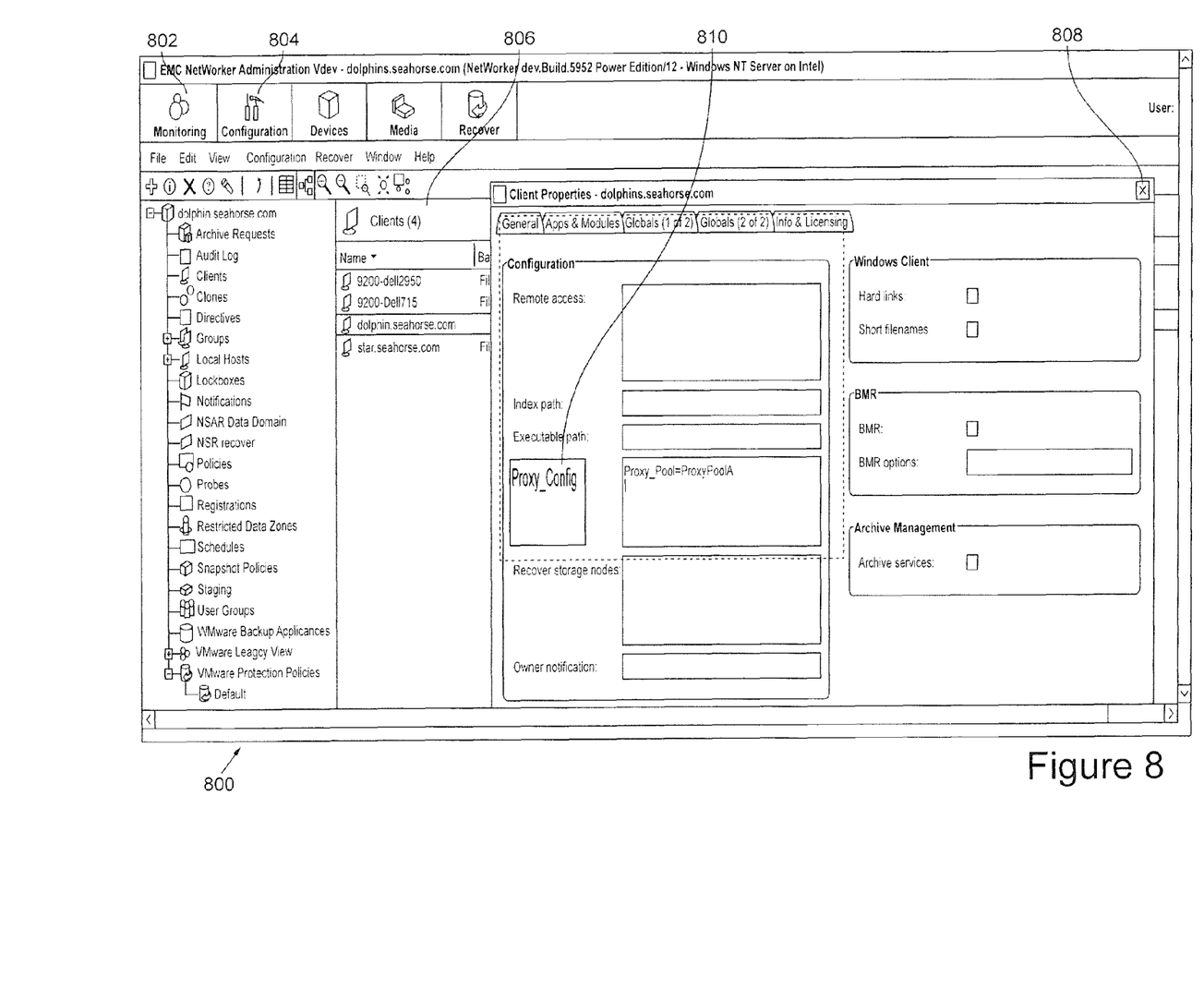
FIG. 8 shows an exemplary image of a graphical user interface presented in a web browser at a client machine, in accordance with some implementations.

FIG. 8 shows an exemplary image of a graphical user interface presented in a web browser at a client machine, in accordance with some implementations. As previously discussed, the resources available for the backup or recovery operation may be specified by a resource configuration value. The resource configuration value may be specified prior to a backup or recovery operation and may be used by subsequent backup or recovery operations. Image 800 illustrates an example of an implementation in which a user may specify a resource pool value that represents a pool of resources that may be used during the backup or recovery operation. Accordingly, image 800 may include data field 802, data field 804, data field 806, data field 808, and data field 810.

Data field 802 may be a menu bar that is part of a software application that provides backup and recovery services. For example, data field 802 may be a menu bar that enables a user to toggle between display windows of a cloud-based web application, such as NetWorker® provided by EMC²®. Thus, in response to a user selecting a particular icon, data field 802 may cause the display of a window or pane. In the regard, as shown in FIG. 8, data field 802 may also include data field 804, which may be a tab configured to cause the display of a configuration window in response to receiving an input. In this instance, data field 804 includes a tab labeled "Configuration" and causes the display of one or more user interface components in response to receiving an input from a user. The user interface components may enable configuration of backup or recovery operations for one or more clients.

Data field 806 may be displayed in response to data field 804 receiving an input. In various implementations, data field 806 may display one or more clients associated with the software application. In this instance, four clients are identified. A user may select and configure backup or recovery operation settings for each client. As shown in FIG. 8, a client identified by the domain name "dolphin.seahorse.com" has been selected.

In some implementations, data field 808 may display a configuration window in response to a client being selected from data field 806. As shown in FIG. 8, data field 808 displays a configuration window for the client "dolphin.seahorse.com" in response to the user selection "dolphin.seahorse.com" in data field 806. Data field 808 may include several data fields associated with various configuration settings for a selected client. For example, data field 808 may include data field 810, which may be configured to receive an input from a user that includes a resource pool value. Thus, a user may enter a resource pool value into data field 810 that identifies a pool of proxy hosts. As illustrated in FIG. 8, the user has indicated that "ProxyPoolA" should be used during a backup or recovery operation for the client "dolphin.seahorse.com." When a backup or recovery operation is later performed, this pool name may be translated to identify a pool of hosts used during the backup or recovery operation.

Returning to FIG. 7, as shown at step 704, the resource configuration value may not include a resource pool value, but may instead include one or more data values that identify the individual proxy hosts themselves. Thus, in various implementations, instead of using an identifier, such as a resource pool value, to identify an entire pool of resources, the proxy hosts may be identified based on their respective internet protocol (IP) addresses or, may be based on individual host names that can be translated into IP addresses. Thus, the resource configuration value may include an ordered list of identifiers that identify each of the proxy hosts that may be used during the backup or recovery operation.

Figure 9:
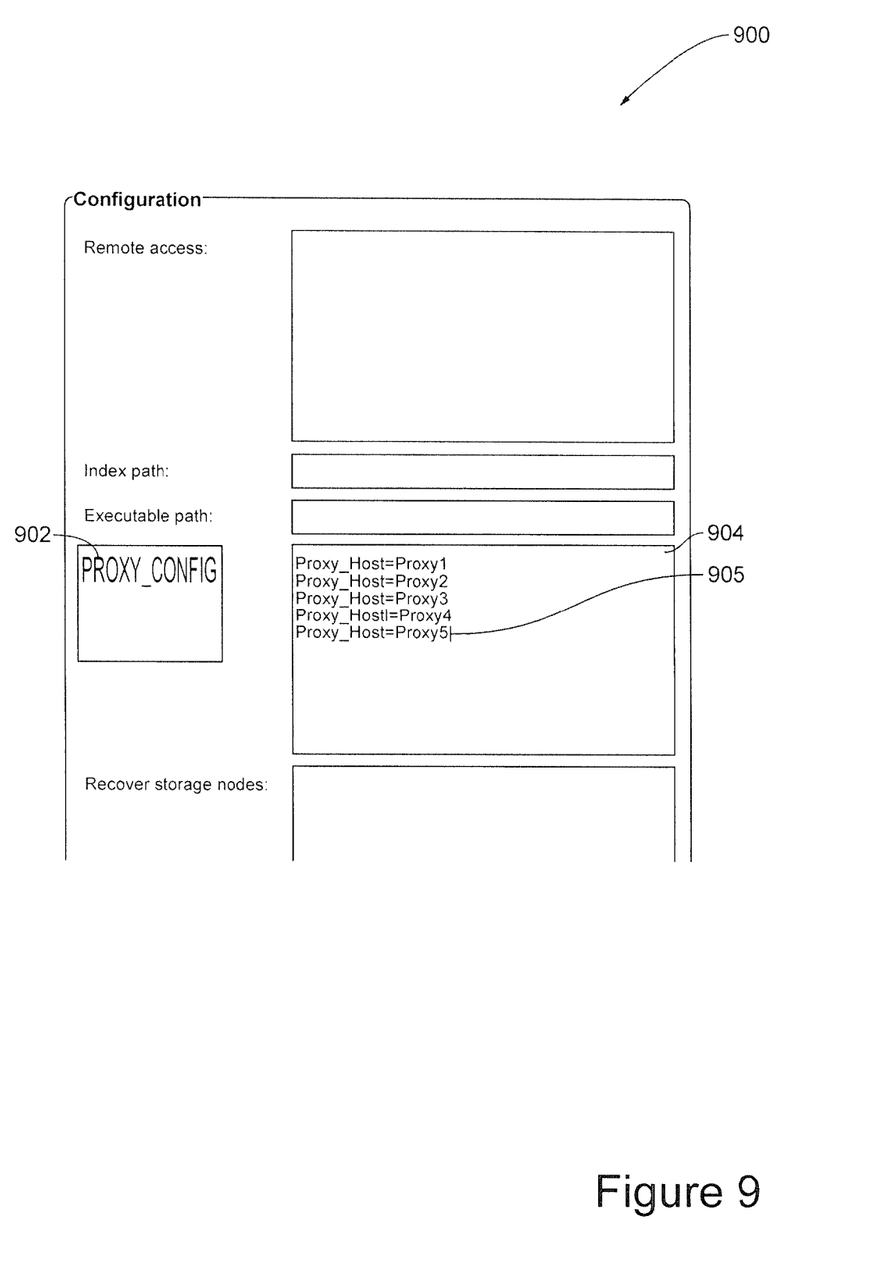
FIG. 9 shows another exemplary image of a graphical user interface presented in a web browser at a client machine, in accordance with some implementations.

FIG. 9 shows another exemplary image of a graphical user interface presented in a web browser at a client machine. The interface illustrated in FIG. 9 may be a different view of the graphical user interface described in FIG. 8. For example, image 900 may be a view of one or more data fields configured to receive a resource configuration value. Thus, image 900 illustrates an example of an implementation in which a user may specify individual storage nodes to be used during the backup or recovery operation. As similarly discussed with reference to FIG. 8, the storage nodes may be specified prior to a backup or recovery operation and may be used by backup or recovery operations that are performed subsequently. Accordingly, image 900 may include data field 904 and data entry 906.

Data field 904 may be configured to receive an input from a user that identifies one or more resources, such as storage nodes, which may be used during a backup or recovery operation for the selected client. Data field 904 may be further configured to receive multiple data entries from the user, such as data entry 906. As shown in FIG. 9, the user has specified individual proxy hosts that should be used during a backup or recovery operation of the selected client. For example, data entry 906 is a data entry that specifies that the proxy host "Proxy5" should be used during a backup or recovery operation. When a backup or recovery operation is later performed, this list may be used to identify resources that may be used for the backup or recovery operation. In some implementations, the host names may be translated to IP addresses at run time.

Returning to FIG. 7, if the resource configuration value does not include a resource pool value, or if one is included but has already been converted at step 706, then an affinity list of resources may be generated at step 708. The affinity list of resources may be a list of resources that may be used for a requested backup or recovery operation. The affinity list may be generated during run time and in response to the request for the backup or recovery operation. Thus, in contrast to static associations between clients and resources, the affinity list may be populated dynamically, during run time, and for each backup or recovery operation. In various implementations, the resources that were previously identified based on the resource configuration value may form the basis of the affinity list of resources. Thus, a backup server may retrieve and analyze the list of resources that resulted from the conversion of a pool name, or the list of resources that was specified by a user. The backup server may use the retrieved list as the affinity list.

Figure 10:
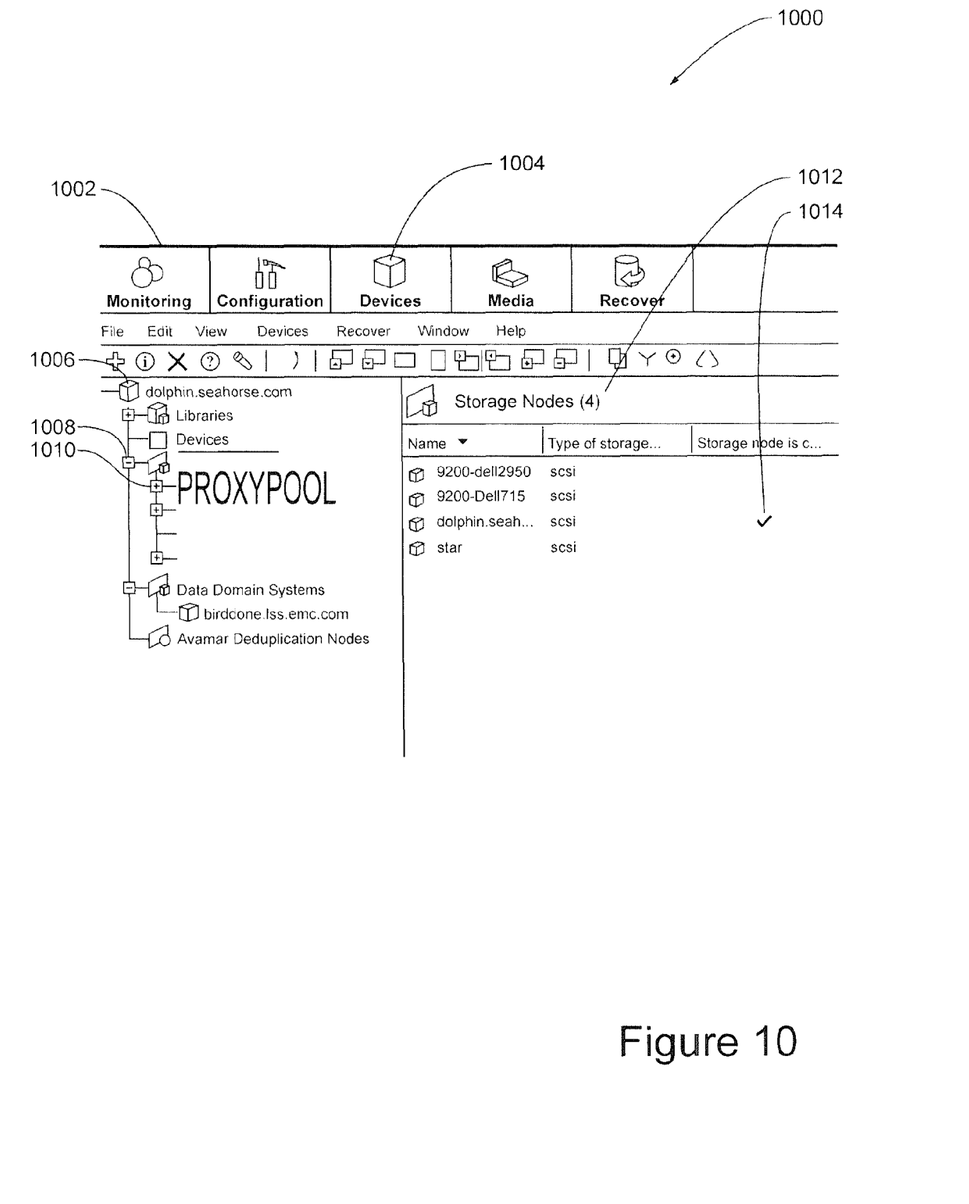
FIG. 10 shows another exemplary image of a graphical user interface presented in a web browser at a client machine, in accordance with some implementations.

FIG. 10 shows an exemplary image of a graphical user interface presented in a web browser at a client machine, in accordance with some implementations. Image 1000 illustrates an example of an implementation in which an affinity list of storage nodes has been generated based on a specified resource pool. In this instance, the affinity list has been generated during run time based on a previously specified resource pool value and in response to a request for a backup or recovery operation. Accordingly, image 1000 may include data fields 1002 through 1014.

As similarly discussed above with reference to FIG. 8, in some implementations, data field 1002 may be a menu bar that is part of a software application that provides backup and recovery services. In some implementations, data field 1002 may include data field 1004. As shown in FIG. 10, data field 1004 may be a tab configured to cause the display of a window that provides information about storage nodes associated with a client in response to receiving an input. In this instance, data field 1004 includes a tab labeled "Devices" and causes the display of one or more user interface components in response to receiving an input from a user. In various implementations, the user interface components enable the display of all storage nodes included in a pool associated with a particular client.

In various implementations, data field 1006 may display all clients associated with the software application, such as a backup or recovery application. As shown in FIG. 10, the client "dolphin.seahorse.com" is associated with the software application because the software application is being used to provide backup and recovery services for the domain "dolphin.seahorse.com." In some implementations, data field 1006 may include data field 1008, which may provide an expandable view of all pools of resources associated with the client. In this circumstance, data field 1008 may be expanded to show several pools of resources that may be used during backup or recovery operations for the client "dolphin.seahorse.com." For example, data field 1008 may include data field 1010 that displays a particular pool of resources, and may be configured to receive an input, such as a mouseclick, that causes the display of information about the pool. In this example, data field 1010 displays a pool of resources named "Proxypool."

In some implementations, data field 1012 may display all storage nodes included in the pool of resources identified by data field 1010. In FIG. 10, data field 1012 displays all resources included in the pool or resources named "Proxypool." Data field 1012 may include data field 1014, which may provide an indication, such as a checkmark, that a particular resource or storage node is currently being used for backup or recovery operations of its associated client.

Returning to FIG. 7, at step 710, it may be determined whether or not a first storage node in the affinity list is available. Thus, according to various implementations, once the affinity list of resources has been generated, resources included in the list may be checked to verify whether or not they are available for the requested backup operation. Performing this verification step may compensate for changes in the resources included in the affinity list that may have occurred since the underlying resource reconfiguration value was initially defined. In various implementations, changes associated with resources may occur during run time. For example, some resources that were initially included in a pool of resources may become unavailable, be down for service, or otherwise be unsuitable for the backup operation due to hardware or software reconfigurations. By checking the availability of resources included in the affinity list during run time, a backup server may avoid mapping a client to a resource which is now unavailable, and thus prevent failure of the backup operation.

For example, a proxy host server may have been included in the resource configuration file underlying a generated affinity list. Thus, the proxy host server may have been included in the affinity list. However, at some point after the resource configuration file was created, a configuration of the proxy host server may have changed. For example, the proxy host server may now be associated with a smaller storage capacity, been reformatted to a different storage stack, or have been assigned to a different tier of a storage system. In each situation, the proxy host server may no longer be capable of storing the backup information, such as a snapshot backup, for the production host server associated with the backup operation. In various implementations, the backup server may determine that such a change has occurred by querying data maintained by the policy manager and session manager, or by communicating with an agent running on the proxy host server. If the backup server determines that such a change has occurred, the backup server may determine that the proxy host server is unavailable.

The backup server may also verify the availability of one or more resources identified by the affinity list by determining if they are operational. In some implementations, resources might not be operational if there has been a software or hardware failure, or if they are down for maintenance or service. The backup server may determine whether or not a storage node is operational by sending a test signal to verify its operability. For example, the backup server may ping the storage node and analyze the response received from the storage node. In another example, the backup server may initiate a communications session with an agent running at the storage node. The backup server may also check data managed and stored by the policy manager and session manager. The data managed by the policy manager and session manager may include information that may identify a failure or service problem for a particular storage node. In some implementations, the backup server may remove a storage node from the affinity list in response to determining that the node is not operational, or may skip the storage node and move on to the next storage node in the affinity list.

Accordingly, if the first storage node is not available, at step 712, it may be determined whether or not another storage node is included in the affinity list. Thus, in response to determining that a first storage node is not available, the backup server may analyze the affinity list to identify other storage nodes. If there are no other storage nodes in the affinity list, backup storage node selection method 700 may terminate. However, if another storage node is identified, at step 714, the backup server may analyze the next identified storage node in the affinity list and return to step 710. Additional storage nodes may be checked until an available storage node is identified. Thus, a backup server may analyze resources included in the affinity list, determine which resources are available, and select a resource which is currently available. In this way, the backup server may update the affinity list based on the availability of resources dynamically and during run time.

As illustrated at step 716 in FIG. 7, the backup server may determine that the storage node is busy. For example, a storage node may be operational and capable of performing a backup or recovery operation, yet busy performing a backup or recovery operation for another client. As a result, the storage node may not currently be able to perform a backup or recovery operation of the selected client.

At step 718, if the storage node is busy, the backup server may determine if another storage node is included in the affinity list. In other words, the backup or recovery server may analyze one or more entries in the affinity list to identify additional available storage nodes. If the affinity list does not include another storage node, backup or recovery storage node selection method 700 may terminate. If another storage node is identified, method 700 may return to step 710 to determine whether or not that storage node is available and is not busy. Additional storage nodes may be checked until an available storage node is identified that is not busy. Thus, a backup server may analyze resources included in the affinity list, determine which resources are busy, and select a resource which is not busy or has the lightest processing load. In this way, the backup server may implement load balancing dynamically and during run time.

Returning to step 716, if the storage node is not busy, at step 720, the storage node may be selected as a proxy host. Thus, according to various implementations, the backup server may select a storage node from the resource pool that is both available and not busy. The selected storage node may be used as the target of backup and recovery operations for a client. The selection may be made automatically and during run time. Thus, aside from the initial configuration of the pools of resources, the selection of the storage node may occur during run time and in accordance with a method that does not need additional input from a user.

The selection of the proxy host may also be based on additional factors. For example, the selection may be based on a preferred order of resources. As previously discussed, a user may specify an order of resources in the resource configuration value that underlies the affinity list. In this example, if multiple resources are identified that are available and aren't busy, priority may be given to resource that is ordered first. For example, this may be the resource that is closest to the top of a list.

In another example, the selection may be based on a set of predetermined rules specified by a user prior to the backup operation. For example, a user may specify that only proxy host servers with at least a minimum value of storage capacity may be selected. In some implementations, the set of predetermined rules may be system generated. Similar to the previous example, the backup server may generate a rule that does not select resources with storage capacities less than the size of data that is being backed up. It will be appreciated that any algorithm capable of selecting a storage node from the affinity list may be implemented.

The selection of the storage node may also be based on a context associated with the requested backup or recovery operation. The context may be one or more backup or recovery operations that are dependent on or depend from the requested backup or recovery operation. For example, the request may be for a snapshot backup that is part of a series of periodic backups. Thus, the snapshot backup may depend on information stored in previous backups to enable a recovery operation. In this instance, the backup server may select or give preference to a storage node that was used to store the previous snapshot backups if the storage node is available and not busy.

At step 722, backup and recovery operations may be performed using the selected storage node as a proxy host. Thus, according to various implementations, information stored at a source LUN may be retrieved and stored at a target LUN associated with the selected proxy host. The information may be a snapshot backup of an application, which includes one or more data values identifying the current state of the application that may be retrieved and stored by the proxy host at a target location. The backup and recovery operations may be performed automatically. In addition, the backup and recovery operations may be performed periodically. Accordingly, method 700 may be repeated as part of a periodic automated backup or recovery process. In each iteration, method 700 may be used to dynamically assign resources to the client and perform backup and recovery operations.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method comprising:
   receiving an indication that a first backup or recovery operation should be performed for at least one storage location;
   retrieving a resource configuration value in response to receiving the indication that the first backup or recovery operation should be performed for the at least one storage location;
   identifying a plurality of resources based on the retrieved resource configuration value, the plurality of resources being a pool of resources configured to store a backup of one or more data values stored in the at least one storage location; and
   selecting a first resource of the plurality of resources as a target of the backup or recovery operation, wherein the selecting is based on at least one performance capability of at least one resource of the plurality of resources.

2. The method of claim 1, wherein the at least one performance capability comprises a processing load carried by the at least one of the plurality of resources.

3. The method of claim 1, wherein the at least one performance capability comprises an availability of the at least one resource of the plurality of resources.

4. The method of claim 1, wherein the selecting is based on one or more characteristics of at least one resource of the plurality of resources, the one or more characteristics being selected from the group consisting of: a network level, a storage stack type, and a storage capacity of a storage node.

5. The method of claim 1, wherein the selecting is performed in response to receiving the indication that the first backup or recovery operation should be performed.

6. The method of claim 1, wherein the plurality of resources comprises a plurality of storage nodes, wherein each storage node of the plurality of storage nodes is a proxy host server coupled to a target logical unit number (LUN).

7. The method of claim 6, wherein the plurality of storage nodes are operated by a provider of an enterprise application that provides backup and recovery services for the at least one storage location.

8. The method of claim 1, wherein the plurality of resources is identified based on a pool of resources previously identified by a user of the software application.

9. The method of claim 8, wherein the pool of resources comprises an ordered list of resources, and wherein the first resource of the plurality of resources is selected based on the order of the resources included in the list.

10. The method of claim 1 further comprising:
    receiving an indication that a second backup or recovery operation should be performed for the at least one storage location; and
    selecting a second resource of the plurality of resources as a target of the second backup or recovery operation.

11. The method of claim 10, wherein the first resource is different than the second resource.

12. A computer program product, comprising a non-transitory computer readable medium having a computer-readable program code embodied therein, the computer-readable program code adapted to be executed by one or more processors to:
    receive an indication that a first backup or recovery operation should be performed for at least one storage location;
    retrieve a resource configuration value in response to receiving the indication that the first backup or recovery operation should be performed for the at least one storage location;
    identify a plurality of resources based on the retrieved resource configuration value, the plurality of resources being a pool of resources configured to store a backup of one or more data values stored in the at least one storage location; and
    select a first resource of the plurality of resources as a target of the backup or recovery operation, wherein the selecting is based on at least one performance capability of at least one resource of the plurality of resources.

13. The computer program product of claim of claim 12, wherein the at least one performance capability comprises a processing load carried by the at least one of the plurality of resources.

14. The computer program product of claim 12, wherein the at least one performance capability comprises an availability of the at least one resource of the plurality of resources.

15. The computer program product of claim 12, wherein the plurality of resources is identified based on a pool of resources previously identified by a user of the software application.

16. The computer program product of claim 12, the program code including further instructions to:
   receive an indication that a second backup or recovery operation should be performed for the at least one storage location; and
   select a second resource of the plurality of resources as a target of the second backup or recovery operation.

17. A system comprising:
   a processor-based data management system, which causes processors of a server, to:
      receive an indication that a first backup or recovery operation should be performed for at least one storage location;
      retrieve a resource configuration value in response to receiving the indication that the first backup or recovery operation should be performed for the at least one storage location;
      identify a plurality of resources based on the retrieved resource configuration value, the plurality of resources being a pool of resources configured to store a backup of one or more data values stored in the at least one storage location; and
      select a first resource of the plurality of resources as a target of the backup or recovery operation, wherein the selecting is based on at least one performance capability of at least one resource of the plurality of resources.

18. The system of claim of claim 17, wherein the at least one performance capability comprises a processing load carried by the at least one of the plurality of resources.

19. The system of claim 17, wherein the at least one performance capability comprises an availability of the at least one resource of the plurality of resources.

20. The system of claim 17, wherein the plurality of resources is identified based on a pool of resources previously identified by a user of the software application.

* * * * *